(12) United States Patent
Sendaya

(10) Patent No.: US 12,441,126 B2
(45) Date of Patent: Oct. 14, 2025

(54) PRINTER

(71) Applicant: BROTHER KOGYO KABUSHIKI KAISHA, Nagoya (JP)

(72) Inventor: Naoki Sendaya, Musashino (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 198 days.

(21) Appl. No.: 18/342,613

(22) Filed: Jun. 27, 2023

(65) Prior Publication Data

US 2024/0001694 A1     Jan. 4, 2024

(30) Foreign Application Priority Data

Jun. 29, 2022 (JP) .................................. 2022-104388

(51) Int. Cl.
| | |
|---|---|
| *B41J 11/46* | (2006.01) |
| *B41J 2/33* | (2006.01) |
| *B41J 3/407* | (2006.01) |
| *B41J 11/00* | (2006.01) |
| *B41J 29/02* | (2006.01) |

(52) U.S. Cl.
CPC .............. *B41J 11/46* (2013.01); *B41J 2/33* (2013.01); *B41J 3/4075* (2013.01); *B41J 11/007* (2013.01); *B41J 29/023* (2013.01)

(58) Field of Classification Search
CPC ... B41J 11/46; B41J 11/007; B41J 2/33; B41J 2/32; B41J 3/4075; B41J 32/00; B41J 29/023
See application file for complete search history.

(56) References Cited

U.S. PATENT DOCUMENTS

| | | |
|---|---|---|
| 5,657,066 A | 8/1997 | Adams et al. |
| 2011/0250000 A1 | 10/2011 | Anderson et al. |
| 2020/0376864 A1 | 12/2020 | Kobayashi |
| 2020/0401774 A1 | 12/2020 | Ackley et al. |

FOREIGN PATENT DOCUMENTS

| | | | |
|---|---|---|---|
| JP | 2000-127564 A | 5/2000 |
| JP | 2005-212373 A | 8/2005 |
| JP | 2012-60596 A | 3/2012 |
| JP | 2012-80346 A | 4/2012 |
| JP | 2020-184681 A | 11/2020 |
| JP | 2020-196559 A | 12/2020 |

*Primary Examiner* — Kristal Feggins
(74) *Attorney, Agent, or Firm* — KENEALY VAIDYA LLP

(57) ABSTRACT

A printer includes a medium supply unit, a head, a discharge outlet, a take-up unit, and a reader. The medium supply unit is configured to supply a medium. The head is configured to perform printing onto the medium supplied from the medium supply unit. The discharge outlet is configured to discharge the medium onto which printing has been performed by the head and conveyed along a discharge path connecting the head and the discharge outlet. The take-up unit is arranged below the head and is configured to take up the medium onto which printing has been performed by the head or backing paper with a label peeled off from the medium. The reader is arranged on a take-up path connecting the head to the take-up unit and is configured to read the medium onto which printing has been performed by the head and conveyed along the take-up path.

13 Claims, 8 Drawing Sheets

PRINTER

REFERENCE TO RELATED APPLICATIONS

This application claims priority from Japanese Patent Application No. 2022-104388 filed on Jun. 29, 2022. The entire content of the priority application is incorporated herein by reference.

BACKGROUND ART

Present disclosure relates to a printer.

In a printer, a medium is supplied from a medium support to a head assembly. A ribbon is supplied from a ribbon supply spindle to the head assembly. Ink from the ribbon is transferred to the medium by the print head of the head assembly. The printed medium is then discharged through a discharge outlet or taken up by a take-up spindle. The ribbon is taken up by a ribbon take-up spindle.

DESCRIPTION

In the printer described above, it is assumed that a reading unit for reading a barcode printed on the medium is provided to check the print quality of the printed medium. In this case, it is necessary to add the reading unit at a position near the discharge outlet through which the printed medium will be discharged. However, in this printer, there is not enough space to arrange the reading unit at a position near the opening. In this case, some sort of measure must be taken, such as to mount the reading unit to the outside of the printer, or increase the distance from the head to the discharge outlet and arrange the reading unit in that space. In either case, the size of the printer will likely increase due to providing the reading unit.

Various embodiments of the general principles described herein provide a printer capable of checking the print quality of a medium with a reading unit, while suppressing an increase in size of the printer.

Embodiments herein provide a printer configured to perform printing onto a medium including a label and backing paper. The printer includes a medium supply unit, a head, a discharge outlet, a take-up unit, and a reader. The medium supply unit is configured to supply the medium. The head is configured to perform printing onto the medium supplied from the medium supply unit. The discharge outlet is configured to discharge the medium onto which printing has been performed by the head and conveyed along a discharge path connecting the head and the discharge outlet. The take-up unit is arranged below the head and is configured to take up the medium onto which printing has been performed by the head or the backing paper with the label peeled off from the medium. The reader is arranged on a take-up path connecting the head to the take-up unit and is configured to read the medium onto which printing has been performed by the head and conveyed along the take-up path.

In the printer described above, the reading unit is arranged in a take-up path connecting the head and the take-up unit. Therefore, the printer is able to check the print quality of the medium with the reading unit, while suppressing an increase in size of the printer.

Embodiments herein also provide a printer including a medium supply unit, a head, a first discharge outlet, a second discharge outlet, and a reader. The medium supply unit is configured to supply a medium. The head is configured to perform printing onto the medium supplied from the medium supply unit. The first discharge outlet is configured to discharge the medium onto which printing has been performed by the head and conveyed along a first discharge path connecting the head and the first discharge outlet. The second discharge outlet is arranged below the first discharge outlet and is configured to discharge the medium onto which printing has been performed by the head and conveyed along a second discharge path connecting the head and the second discharge outlet. The second discharge outlet is different from the first discharge outlet. The reader is arranged on the second discharge path and is configured to read the medium onto which printing has been performed by the head. The second discharge path includes a first path extending downward, below the head. The reading surface of the reader faces the first path.

In the printer described above, the reading unit is arranged in the second discharge path from the head to the second discharge outlet. Therefore, the printer is able to check the print quality of the medium with the reading unit, while suppressing an increase in size of the printer.

Figure 1:
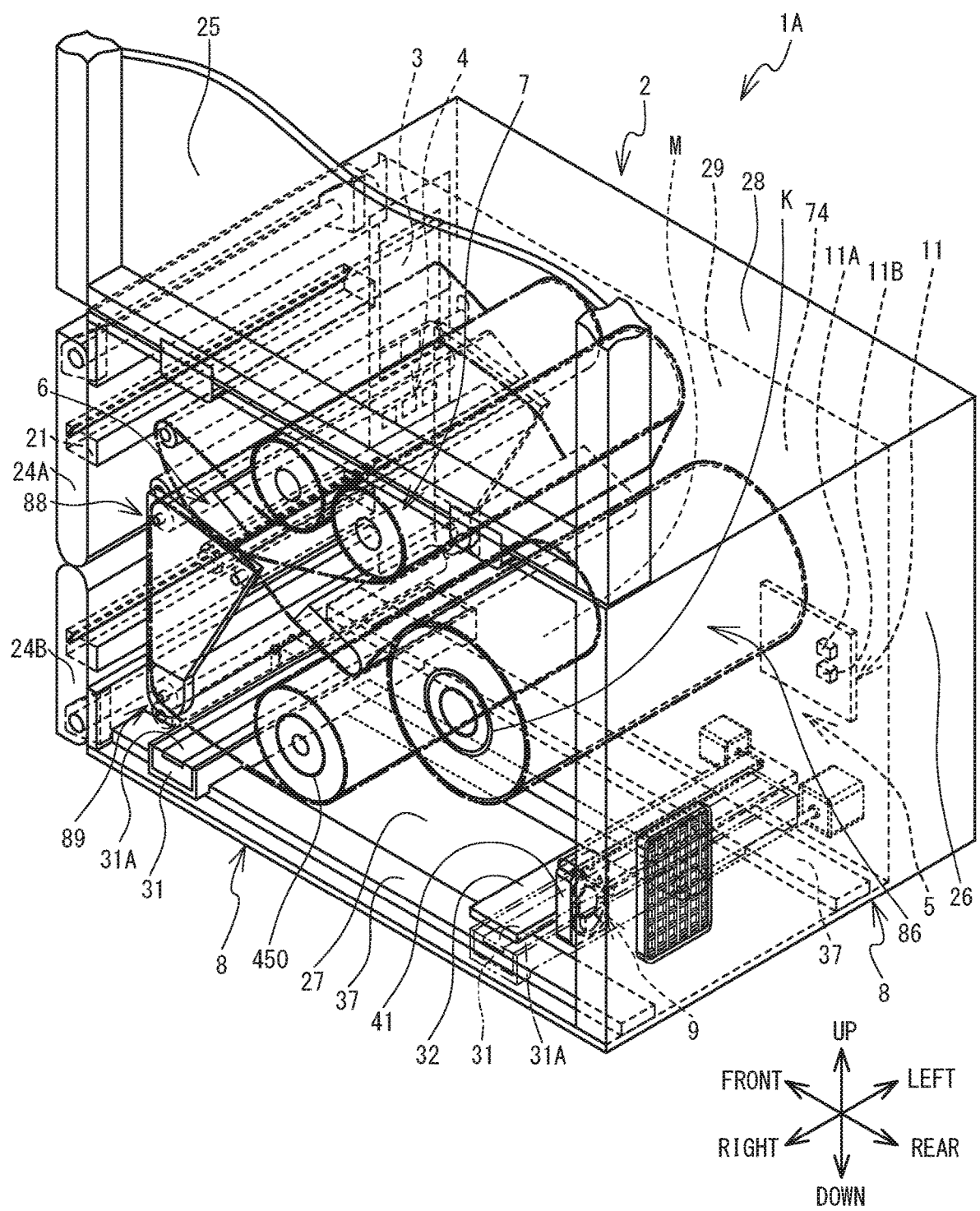
FIG. 1 is a perspective view of a printer.

A printer 1A according to the present disclosure will now be described with reference to the accompanying drawings in order. The drawings that are referred to are intended to be used to describe technical features that the present disclosure can employ. The described structures of the devices and the like are merely illustrative examples and are not intended to be limited thereto. In the description below, the upper left side, lower right side, upper right side, lower left side, upper side, and lower side in FIG. 1 respectively corresponds to the front side, rear side, left side, right side, upper side, and lower side of the printer 1A.

The schematic construction of the printer 1A will now be described with reference to FIG. 1 to FIG. 3. The printer 1A is a thermal printer that performs printing on a long medium M. The medium M is wound in a roll shape on a cylindrical paper tube K, for example. For the medium M, a label and backing paper are overlapped, for example. When a desired print image is input by a user, the printer 1A prints the print image on the label. The print image may be, for example, marks, numbers, letters, symbols, barcodes, or the like. The printer 1A can convey the medium M after printing, for example, in an unchecked paper discharge mode and a take-up mode, which will be described later.

The printer 1A is provided with a main body 2, a display unit 3, and an operation unit 4. The main body 2 has a parallelepiped shape that can be placed on a table. The main body 2 includes a center support wall 74, covers 24A and 24B, a right panel 25, a rear panel 26, a left panel 29, a lower panel 27, and an upper panel 28.

The center support wall 74 is a plate that extends in the front-rear direction when viewed from the right side. The upper panel 28 is positioned at the upper end of the center support wall 74. The lower panel 27 is positioned at the lower end of the center support wall 74. The upper panel 28 and the lower panel 27 are plates that extend in the front-rear direction in a plan view. The rear panel 26 is positioned at the rear end of the center support wall 74. The rear panel 26 is a plate that extends in the up-down direction in a back view. The left panel 29 is positioned to the left of the center support wall 74 of the printer 1A.

The right panel 25 is positioned to the right of the center support wall 74 of the printer 1A. The right panel 25 is a plate having a rectangular shape when viewed from the right side, and is rotatably supported by the right end portion of the upper panel 28. The right panel 25 can rotate between a closed position that closes the right side surface of the printer 1A, and an open position that opens the right side surface of the printer 1A. When the right panel 25 is in the open position, the user can see the inside of the printer 1A from the right.

The cover 24A is a plate having a rectangular shape when viewed from the front, and is rotatably supported by the front end of the upper panel 28. The cover 24A can rotate between a closed position that closes the main body 2 of the printer 1A, and an open position that opens the main body 2 of the printer 1A.

A first discharge outlet 21 for the medium M is formed in the cover 24A. The first discharge outlet 21 has a rectangular shape that is long in the left-right direction when viewed from the front. The first discharge outlet 21 discharges the medium M that has been printed. A cutter 22 (refer to FIG. 2) is arranged inside the first discharge outlet 21. The cutter 22 extends in the left-right direction. The cutter 22 cuts the medium M that has been discharged from the first discharge outlet 21.

The display unit 3 is arranged on an upper left portion of the cover 24A. The display unit 3 displays various images. The operation unit 4 is arranged on the left portion of the cover 24A, below the display unit 3. The operation unit 4 includes a plurality of buttons for the user to input various instructions.

The cover 24B is a plate having a rectangular shape when viewed from the front, and is rotatably supported by the front end of the lower panel 27. The cover 24B can rotate between a closed position that closes the main body 2 of the printer 1A, and an open position that opens the main body 2 of the printer 1A. When the covers 24A and 24B are in the open position, the user can see the inside of the printer 1A from the front.

Figure 2:
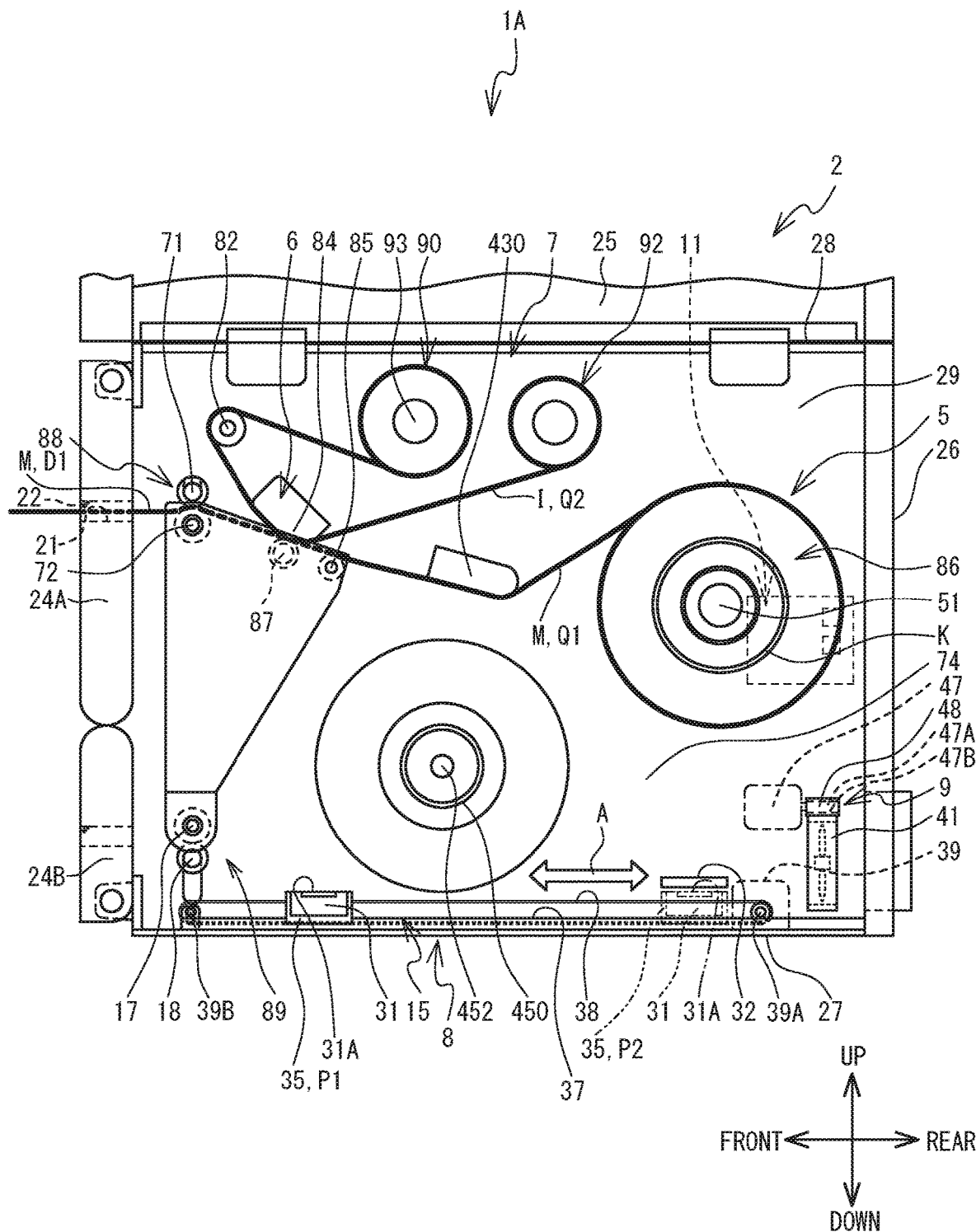
FIG. 2 is a right-side view of the inside of the printer in an unchecked paper discharge mode.

As shown in FIG. 1 and FIG. 2, a controller 11, a medium supply unit 5, a printing unit 6, a ribbon supply unit 7, a take-up unit 450, a reading unit 8, and a maintenance unit 9, and the like, are housed inside the printer 1A. The controller 11 is positioned to the left and rear of the center support wall 74. The controller 11 is provided with a processor 11A and a memory 11B, and the like, and controls the overall operation of the printer 1A.

The medium supply unit 5 is provided with a medium supply spindle 86, a guide post 430, rollers 85 and 87, and conveyers 88 and 89, and the like. The medium supply unit 5 is a device for conveying the medium M inside the printer 1A.

The medium supply spindle 86 is arranged at a center portion in the up-down direction, to the rear inside the printer 1A. The medium M is wound in a roll onto the paper tube K. The paper tube K is attached to a shaft portion 51 that extends in the left-right direction.

A drive unit is positioned to the left of the center support wall 74, and removably engages with the shaft portion 51 of the medium supply spindle 86. The drive unit includes a motor and pulleys and the like, for example. The drive unit rotates the shaft portion 51 and conveys the medium M in the conveyance direction. As a result, the drive unit feeds the medium M toward the printing unit 6. In this case, the conveyance direction of the medium M is generally forward.

Note that the drive unit can also rotate the shaft portion 51 in the reverse direction and wind the medium M in a roll. In this case, the conveyance direction of the medium M is generally rearward.

The guide post 430 is arranged in the center in the front-rear direction inside the printer 1A, and is arranged in front of the medium supply spindle 86. The guide post 430 is a single simple structure made of plastic material, for example. The lower surface of the guide post 430 is a smooth convex surface for guiding the medium M.

The roller 85 is arranged in front of the guide post 430. The roller 85 contacts the medium M from below and conveys the medium M. The roller 87 is arranged above and in front of the roller 85. The roller 87 contacts the medium M from below and conveys the medium M.

The conveyer 88 is arranged above and in front of the roller 87, and to the rear of the first discharge outlet 21. The conveyer 88 includes a conveyance roller 71 and a pinch roller 72. The conveyance roller 71 rotates about an axis extending in the left-right direction. The pinch roller 72 is arranged below the conveyance roller 71 and rotates about an axis extending in the left-right direction. The conveyer 88 performs nip conveyance by sandwiching the medium M from above and below with the conveyance roller 71 and the pinch roller 72. The conveyer 88 drives the conveyance roller 71 using a motor, for example.

The path along which the medium M is conveyed from the medium supply spindle 86 to the roller 87 will be referred to as "conveyance path Q1". A first discharge path D1 is a path connecting a head 84 (position of the roller 87) and the first discharge outlet 21.

The conveyer 89 is arranged below the conveyer 88. The conveyer 89 has a conveyance roller 17 and a pinch roller 18. The conveyance roller 17 rotates around a shaft extending in the left-right direction. The pinch roller 18 is arranged below the conveyance roller 17, and rotates about an axis extending in the left-right direction. The conveyer 89 performs nip conveyance by sandwiching the medium M from above and below with the conveyance roller 17 and the pinch roller 18. The conveyer 89 drives the conveyance roller 17 using a motor, for example.

The printing unit 6 is arranged on a front upper portion inside the printer 1A. The printing unit 6 is a thermal head 84 (hereinafter, referred to as "head 84"), for example. The head 84 is arranged above the roller 87, and faces the roller 87 in the up-down direction. A plurality of heating elements is provided on the lower portion of the head 84. The plurality of heating elements is lined up in the left-right direction.

The head 84 moves between a retracted position, not shown in the drawings, and a print position shown in FIG. 2. When the head 84 is in the retracted position, the head 84 is arranged in a position retracted upward from the roller 87. When the head 84 is in the print position, the head 84 sandwiches the medium M and an ink ribbon I between the head 84 and the roller 87. In this case, printing is performed on the medium M supplied by the medium supply spindle 86, by the plurality of heating elements being selectively heated.

The ribbon supply unit 7 is provided with a ribbon supply spindle 92, a ribbon take-up spindle 90, and a roller 82. The ribbon supply spindle 92 is arranged in the upper interior of the printer 1A, above and in front of the medium supply spindle 86. The roll-shaped ink ribbon I is wound on the ribbon supply spindle 92. The ribbon take-up spindle 90 is arranged in front of the ribbon supply spindle 92, and is arranged above and to the rear of the printing unit 6. The roller 82 is arranged above and in front of the head 84, and in the front of the ribbon take-up spindle 90. The ink ribbon I extends from the lower surface of the head 84 of the printing unit 6 to the roller 82, between the ribbon supply spindle 92 and the ribbon take-up spindle 90. Note that the outer surface of the head 84 may be smooth convex surface similar to the guide post 430, in order to smoothly convey the ink ribbon I.

A drive unit is arranged to the left of the center support wall 74, and removably engages with a shaft portion 93 of the ribbon take-up spindle 90. The drive unit includes a motor and pulleys and the like, for example. By driving the drive unit, the ink ribbon I is conveyed from the ribbon supply spindle 92 and taken up by the ribbon take-up spindle 90.

A ribbon supply path Q2 is a path along which the ink ribbon I is conveyed from the ribbon supply spindle 92 to the ribbon take-up spindle 90.

The take-up unit 450 is detachably provided inside the printer 1A. The take-up unit 450 is an optional item that can be attached as required by the user. The take-up unit 450 is arranged below the conveyance path Q1, in the center portion in the front-rear direction. The take-up unit 450 is arranged below the head 84. The take-up unit 450 is arranged in a position opposite to the first discharge outlet 21 with respect to the head 84 in the front-rear direction. That is, the take-up unit 450 is arranged in a position below the head 84 and away from the first discharge outlet 21. The take-up unit 450 can rotate about a shaft 452 extending in the left-right direction.

The drive unit is arranged to the left of the center support wall 74, and is detachably mounted to the shaft 452. The drive unit includes a motor and pulleys and the like, for example. When the drive unit is driven and the take-up unit 450 rotates, the medium M is wound onto itself on the spindle. Note that the wound medium M can be removed, together with the shaft 452, from the drive unit.

Figure 3:
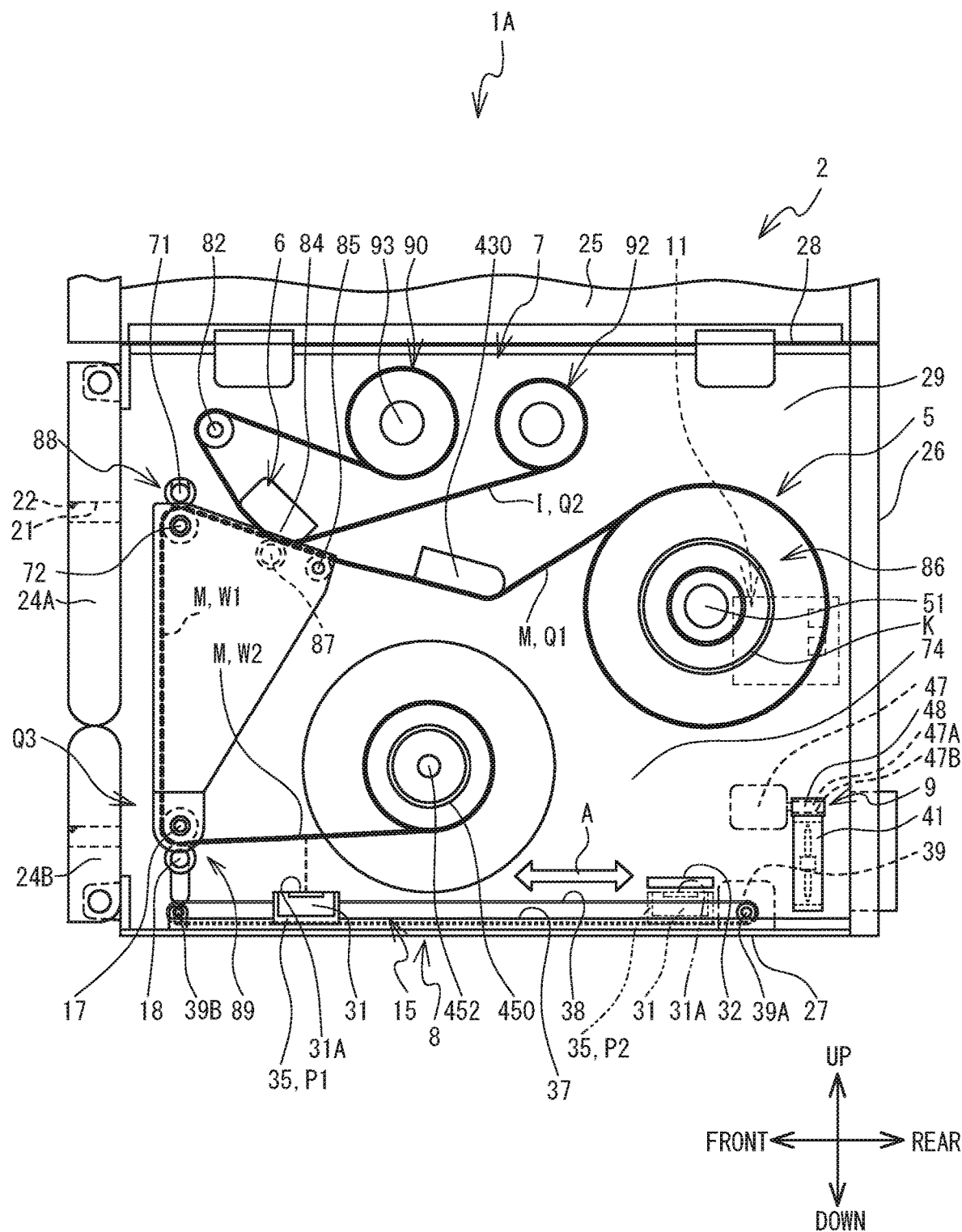
FIG. 3 is a right-side view of the inside of the printer in a take-up mode.

The path from the conveyer 88 to the take-up unit 450 will be referred to as "take-up path Q3" (refer to FIG. 3). The take-up path Q3 includes a first path W1 and a second path W2. The first path W1 is a path along which the medium M is conveyed from the conveyer 88 to the conveyer 89. The first path W1 extends downward at the left of and below the head 84. Note that the first path W1 may extend not only in the up-down direction, but also at an angle downward and slightly rearward from the conveyer 88, for example.

The second path W2 is the path of the medium M from the conveyer 89 to the take-up unit 450. The second path W2 extends from the lower end portion of the first path W1 toward the take-up unit 450 in the conveyance direction. The second path W2 extends in substantially the front-rear direction below the head 84. Note that the second path W2 changes on the basis of the amount of medium M taken up by the take-up unit 450, and thus also includes a slanting direction intersecting the front-rear direction.

The reading unit 8 is arranged below the second path W2 and above the lower panel 27, in the up-down direction. The reading unit 8 is provided with a conveyer 15, a reader 31, and an illumination correction plate 32.

The conveyer 15 is provided with a pair of guides 37, a carriage 35, and a motor 39. The pair of guides 37 are fixed to the upper surface of the lower panel 27. The pair of guides 37 are arranged separated from each other on the left and right, and extend in the front-rear direction. The carriage 35 has a box shape extending in the left-right direction and opening upward. The lower surfaces of the left end portion and the right end portion of the carriage 35 are slidably arranged on the upper surfaces of the pair of guides 37.

The motor 39 is arranged inside the printer 1A at the lower rear and to the left of the center support wall 74. A pulley 39A is attached to a rotating shaft of the motor 39. A pulley 39B is fixed, in front of the pulley 39A, to the lower front inside the printer 1A. A belt 38 extends between the pulley 39A and the pulley 39B. The belt 38 is fixed to the front end and rear end of the carriage 35. The belt 38 is conveyed by driving the motor 39. As a result, the carriage 35 moves, together with the belt 38, in the left-right direction (refer to arrow A).

The carriage 35 is able to move between a reading position P1 and a retracted position P2. The reading position P1 is a position below the second path W2, where the medium M conveyed along the second path W2 can be read. The retracted position P2 is a position below the medium supply spindle 86, where the carriage 35 is retracted to the rear from the second path W2.

The reader 31 is mounted to the carriage 35 and supported from below by the carriage 35. More specifically, the reader 31 is arranged below the second path W2 in the take-up path Q3. Such an arrangement of the reader 31 will also be referred to as being arranged in the take-up path Q3 or the second path W2. The reader 31 has a box shape that is long in the left-right direction. The reader 31 can move, together with the carriage 35, in the front-rear direction (refer to arrow A).

The reader 31 reads the medium M that has been printed by the head 84 and conveyed along the take-up path Q3. The reader 31 is, for example, a line sensor or the like, and more specifically, a CIS (Contact Image Sensor) that is long in the left-right direction, or the like. Hereinafter, the light receiving surface of the line sensor will be referred to as "reading surface 31A". The reading surface 31A of the reader 31 faces the second path W2.

The illumination correction plate 32 is arranged at a lower right portion inside the printer 1A, and above the belt 38. The illumination correction plate 32 is arranged opposite to the first path W1 with respect to the take-up unit 450 in the front-rear direction. The illumination correction plate 32 has a rectangular shape that is long in the left-right direction. The illumination correction plate 32 is white in color, for example.

When the carriage 35 is in the retracted position P2, the illumination correction plate 32 faces the reader 31 in the up-down direction. In this case, the reader 31 is arranged below the illumination correction plate 32. When the carriage 35 is in the retracted position P2, the illumination correction plate 32 is read by the reader 31. The reading result of the illumination correction plate 32 is used for shading correction.

The maintenance unit 9 is arranged at a lower rear portion inside the printer 1A and to the rear of the motor 39. The maintenance unit 9 performs maintenance on the reading surface 31A of the reader 31. The maintenance unit 9 is provided with a motor 47, a belt 48, and a fan 41, and the like.

The motor 47 is arranged at the lower rear of the printer 1A, and to the left of the center support wall 74. A pulley 47A is attached to a drive shaft of the motor 47. A pulley 47B is fixed to the main body 2 on the right side of the pulley 47A. The belt 48 extends between the pulley 47A and the pulley 47B. The fan 41 is arranged to the rear of the illumination correction plate 32. The upper surface of the fan 41 is fixed, from below, to the belt 48.

The fan 41 moves in the left-right direction by driving the motor 47. Here, when the carriage 35 is in the retracted position P2, the fan 41 blows air toward the reading surface 31A of the reader 31, or draws in air from above the reading surface 31A of the reader 31, while moving in the left-right direction. When the fan 41 blows air while moving in the left-right direction, the fan blows paper scraps off of the reading surface 31A. Also, when the fan 41 draws in air while moving in the left-right direction, the fan sucks paper scraps off of the reading surface 31A. In this way, maintenance of the reading surface 31A is performed.

The unchecked paper discharge mode of the printer 1A will now be described with reference to FIG. 2. In the unchecked paper discharge mode, the medium M is not read by the reader 31. The user places the right panel 25 in the open position and sets the medium M on the conveyance path Q1 and the first discharge path D1. Then, the user places the right panel 25 in the closed position. The printer 1A moves the head 84 to the print position.

The printer 1A drives the medium supply spindle 86 and the conveyer 88, and supplies the medium M from the medium supply spindle 86 toward the head 84. In this case, the printer 1A drives the ribbon take-up spindle 90 and supplies the ink ribbon I from the ribbon supply spindle 92 toward the head 84. The medium M and the ink ribbon I are conveyed overlapping with each other between the heating elements of the head 84 and the roller 87. In this state, the printer 1A prints a print image onto the medium M by selectively heating the heating elements of the head 84.

The printed medium M is then conveyed along the first discharge path D1, and out of the main body 2 through the first discharge outlet 21. The ink ribbon I after printing is taken up by the ribbon take-up spindle 90 via the printing unit 6.

When printing is completed, the user uses the cutter 22 to cut the medium M on which printing has been completed. Then, the user peels the label from the backing paper of the cut medium M and performs the work of adhering the label.

The take-up mode of the printer 1A will now be described with reference to FIG. 3. In the take-up mode, the medium M is read by the reader 31. The user places the right panel 25 in the open position and arranges the medium M on the conveyance path Q1 and the take-up path Q3. Then, the user places the right panel 25 in the closed position.

The printer 1A moves the carriage 35 to the retracted position P2. In this case, the printer 1A drives the fan 41 to perform maintenance on the reading surface 31A of the reader 31. After performing maintenance, the reader 31 reads the illumination correction plate 32. Then, the printer 1A moves the carriage 35, together with the reader 31, to the reading position P1.

The printer 1A drives the medium supply spindle 86, the conveyers 88 and 89, and the take-up unit 450 to supply the medium M from the medium supply spindle 86 toward the head 84. In this case, the printer 1A drives the ribbon take-up spindle 90 to supply the ink ribbon I from the ribbon supply spindle 92 toward the head 84.

The medium M and the ink ribbon I are conveyed overlapping with each other between the heating elements of the head 84 and the roller 87. In this state, the printer 1A prints a print image onto the medium M, by selectively heating the heating elements of the head 84.

The medium M on which printing has been completed is then conveyed toward the conveyer 88. The used ink ribbon I is taken up by the ribbon take-up spindle 90.

The medium M that has passed through the conveyer 88 is conveyed along the first path W1 and the second path W2. When the medium M is conveyed along the second path W2, the reader 31 reads the printed medium M. The reading result is transmitted to the controller 11, for example. The controller 11 determines, on the basis of reading result, whether the print image printed on the label was printed correctly. If it is determined that the print image was not printed correctly, the controller 11 may perform displaying an error on the display unit 3, print images such as VOID and grey hatching on the print image determined not to have been printed correctly, or reprint the print image determined not to have been printed correctly.

When printing has been completed, the user places the right panel 25 in the open position and removes the medium M together with the take-up unit 450. Then, the user peels the label from the backing paper of the taken-up medium M and performs the work of adhering the label.

As described above, the head 84 performs printing on the medium M supplied from the medium supply spindle 86. The take-up unit 450 is arranged below the head 84 and take up the medium M that has been printed by the head 84. The reader 31 is arranged on the take-up path Q3 connecting the head 84 and the take-up unit 450. The reader 31 reads the medium M printed by the head 84 and conveyed along the take-up path Q3.

With the printer 1A, the reader 31 is arranged on the take-up path Q3 connecting the head 84 and the take-up unit 450. Therefore, the printer 1A can check the print quality of the medium M with the reader 31, while suppressing an increase in the size of the printer 1A.

The take-up unit 450 is arranged in a position below the head 84 and opposite to the first discharge outlet 21 with respect to the head 84 in the conveyance direction of the medium M on the first discharge path D1. The take-up path Q3 includes the first path W1 and the second path W2. The first path W1 extends downward below the head 84. The second path W2 extends from the lower end portion of the first path W1 toward the take-up unit 450 in the conveyance direction. The reading surface 31A of the reader 31 faces the second path W2. In the printer 1A, the reader 31 is arranged on the second path W2, so the lower space in the printer 1A can be effectively used.

The carriage 35 supports the reader 31. The carriage 35 is configured to move between the reading position P1 and the retracted position P2. The reading position P1 is a position below the second path W2, where the medium M conveyed along the second path W2 can be read. The retracted position P2 is a position retracted from the second path W2. The motor 39 moves the carriage 35. With the printer 1A, paper dust may fall below the medium M. In this case, the carriage 35 can move from the reading position P1 to the retracted position P2, so the possibility of the reader 31 being affected by paper dust when not in use can be reduced.

The illumination correction plate 32 is arranged opposite to the first path W1 with respect to the take-up unit 450 in the conveyance direction. The retracted position P2 of the carriage 35 is below the illumination correction plate 32. In the printer 1A, when the carriage 35 is in the retracted position P2, the reader 31 is positioned below the illumination correction plate 32. Therefore, the possibility of the reader 31 being affected by paper dust can be reduced.

The reader 31 reads the illumination correction plate 32 when the carriage 35 is in the retracted position P2. With the printer 1A, the reader 31 reads the illumination correction plate 32 when the carriage 35 is in the retracted position P2 and the reader 31 is positioned below the illumination correction plate 32. Therefore, the printer 1A can acquire information necessary to correct the reading result, while reducing the effect of paper dust.

When the carriage 35 is in the retracted position P2, the fan 41 blows air toward the reading surface 31A of the reader 31 or draws in air from above the reading surface 31A of the reader 31. With the printer 1A, when the carriage 35 is in the retracted position P2, the fan 41 is able to clear off paper dust adhered to the reader 31 by blowing air toward the reading surface 31A of the reader 31. The fan 41 can also clear off paper dust adhered to the reader 31 by drawing in air from above the reader 31. As a result, the possibility of the reader 31 being affected by paper dust can be reduced.

The head 84 is provided with a plurality of heating elements. Even when the printer 1A is provided with the head 84, print quality of the medium M can be checked by the reader 31, while suppressing an increase in the size of the printer 1A.

Figure 4:
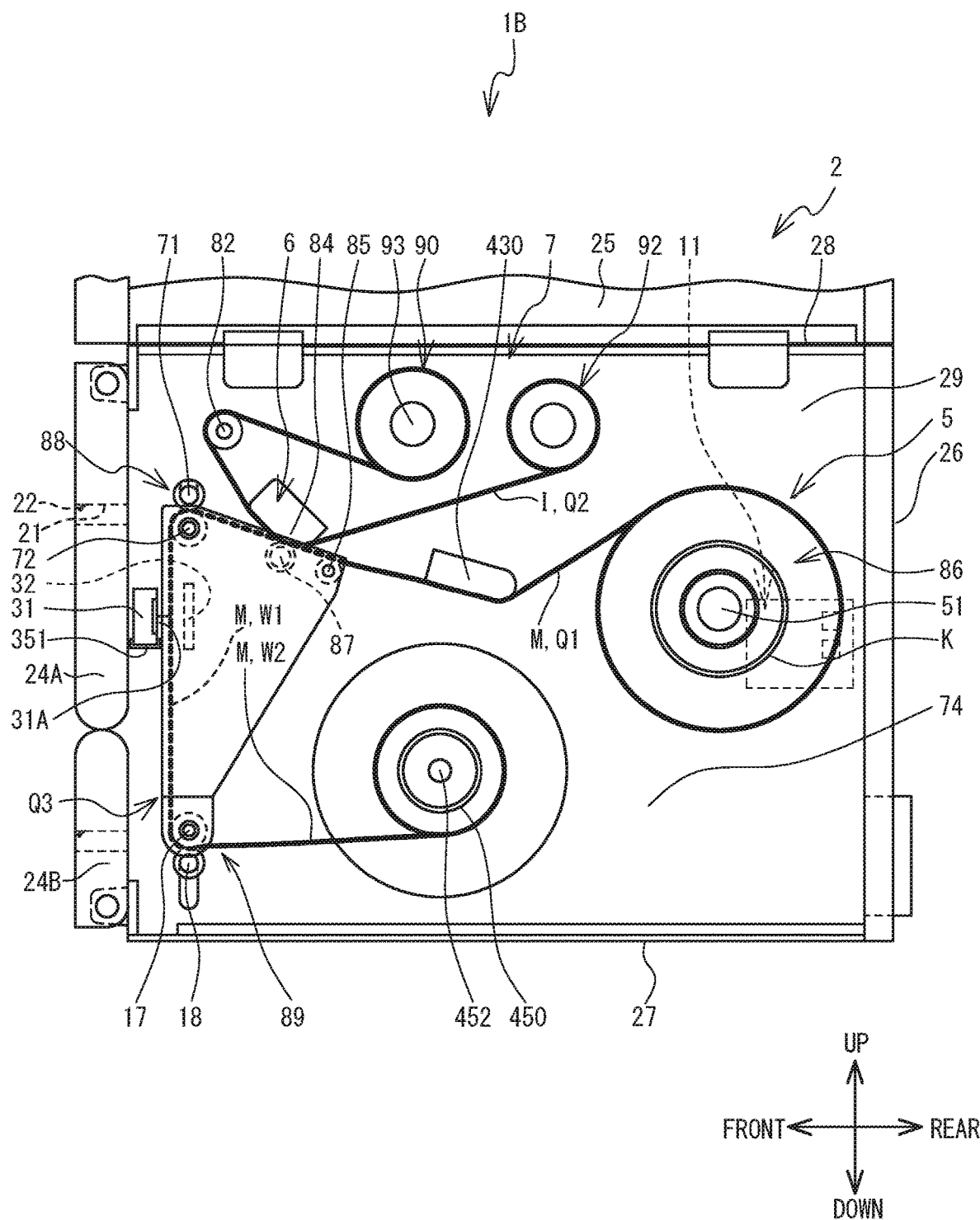
FIG. 4 is a right-side view of the inside of a printer.

A printer 1B will now be described with reference to FIG. 4. In the description below, like reference characters will be used for structures having similar functions as the structures of the printer 1A, and descriptions of those structures will be omitted or simplified. In the printer 1B, the positions in which the reader 31 and the illumination correction plate 32 are arranged differ from those in the printer 1A. Also, with the printer 1B, the take-up mode is executed.

Amounting portion 351 is arranged in front of the first path W1 in the take-up path Q3. The reader 31 is mounted to the mounting portion 351. Such an arrangement of the reader 31 will also be referred to as being arranged on the first path W1. In this case, the reading surface 31A of the reader 31 faces the first path W1. The illumination correction plate 32 is arranged to the rear of the first path W1. The illumination correction plate 32 faces the reading surface 31A of the reader 31 via the first path W1.

Before printing is performed, the printer 1B cause the reader 31 to read the illumination correction plate 32. Then, the printer 1B conveys the medium M with the medium supply unit 5. In this case, the medium supply spindle 86, the conveyers 88 and 89, and the take-up unit 450 may be driven, or only the take-up unit 450 may be driven.

The medium M is conveyed along the conveyance path Q1 and printing is performed by the head 84. After printing has been performed, the medium M is conveyed along the first path W1. In this case, the reader 31 reads the medium M printed by the head 84. Then, the medium M is conveyed along the second path W2 and is taken up by the take-up unit 450. Note that the reader 31 and the illumination correction plate 32 may be arranged near the conveyer 89 in the first path W1. Also, the positions of the reader 31 and the illumination correction plate 32 may be switched.

With the printer 1B, paper dust may fall below the medium M. Because the reading surface 31A of the reader 31 faces the first path W1, the reader 31 tends not to be affected by paper dust emitted from the medium M.

Figure 5:
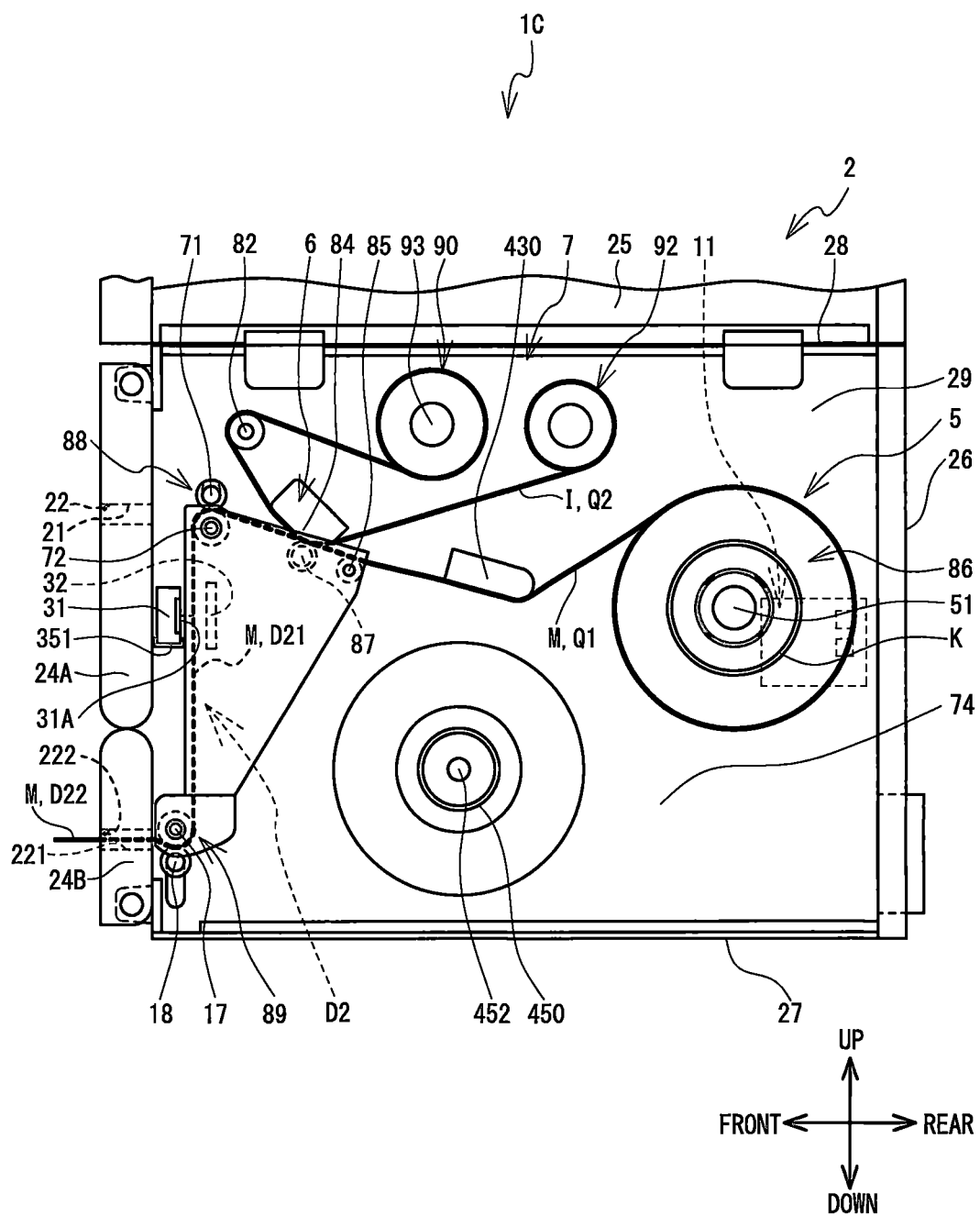
FIG. 5 is a right-side view of the inside of a printer.

A printer 1C will now be described with reference to FIG. 5. In the description below, like reference characters will be used for structures having similar functions as the structures of the printers 1A and 1i, and descriptions of those structures will be omitted or simplified. The printer 1C differs from the printers 1A and 1B in that the positions where the reader 31 and the illumination correction plate 32 are arranged, the position where the conveyer 89 is arranged, and the position where the medium M is discharged are different. The reader 31 and the illumination correction plate 32 are arranged in the same positions as they are in the printer 1B. The conveyer 89 is arranged farther forward than the conveyer 89 is in the printer 1A.

A second discharge outlet 221 is provided in the cover 24B. The second discharge outlet 221 is arranged below the first discharge outlet 21. The shape of the second discharge outlet 221 is similar to that of the first discharge outlet 21. A cutter 222 is provided inside the second discharge outlet 221. The structure of the cutter 222 is similar to the shape of the cutter 22 of the printer 1A.

The second discharge path D2 is a path along which the medium M is conveyed from the roller 87 to the second discharge outlet 221. More specifically, the second discharge outlet 221 is able to discharge the medium M that has been printed by the head 84 and conveyed along the second discharge path D2 connecting the head 84 and the second discharge outlet 221.

The second discharge path D2 includes a first path D21 and a second path D22. The first path D21 extends downward from the conveyer 88 toward the conveyer 89. The second path D22 extends forward from the conveyer 89 toward the second discharge outlet 221. The reader 31 is arranged on the second discharge path D2. The reading surface 31A of the reader 31 faces the first path D21.

Before printing is performed, the printer 1C cause the reader 31 to read the illumination correction plate 32. Then, the printer 1C performs printing. In this case, the printer 1C conveys the medium M with the medium supply unit 5. Note that the medium supply spindle 86 and the conveyers 88 and 89 may be driven, or only the conveyer 89 may be driven.

The medium M is conveyed along the conveyance path Q1 and printing is performed by the head 84. After printing has been performed, the medium M is conveyed along the second discharge path D2. The reader 31 reads the medium M printed by the head 84. Then, the medium M passes through the conveyer 89 and is discharged from the second discharge path D2. Note that when there is a space between the conveyer 89 and the second discharge outlet 221, the reader 31 and the illumination correction plate 32 may be arranged in a path between the conveyer 89 and the second discharge outlet 221 in the second discharge path D2.

In the printer 1C, the reader 31 is arranged on the second discharge path D2 between the head 84 and the second discharge outlet 221. Therefore, the printer 1C can check the print quality of the medium M using the reader 31, while suppressing an increase in the size of the printer 1C.

Figure 6:
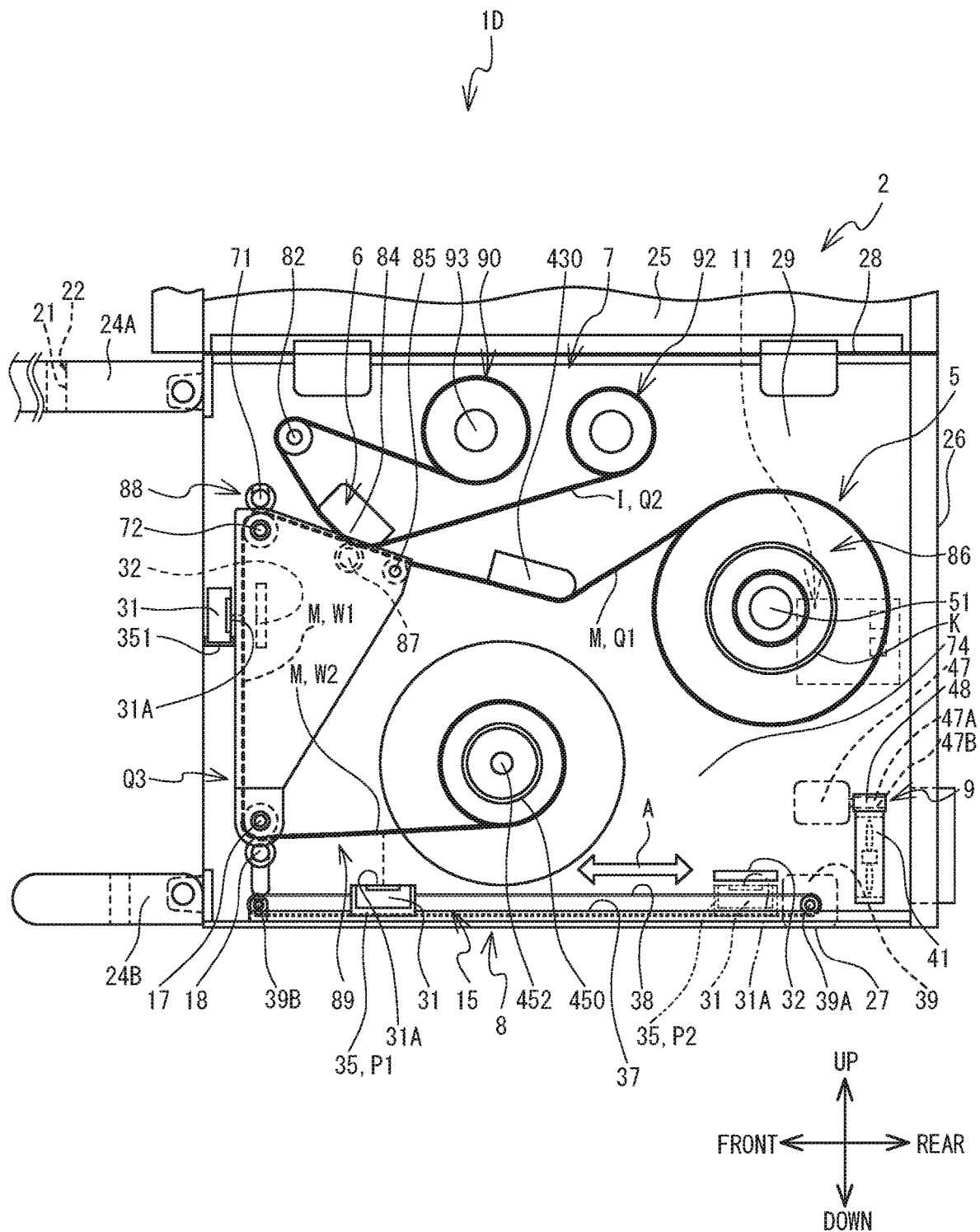
FIG. 6 is a right-side view of the inside of a printer.

A printer 1D will now be described with reference to FIG. 6. In the description below, like reference characters will be used for structures having similar functions as the structures of the printers 1A to 1C, and descriptions of those structures will be omitted or simplified. The printer 1D differs from the printers 1A to 1C in that the position where the reader 31 is arranged can be changed by the user. In the printer 1D, in addition to the structure of the printer 1A, the mounting portion 351 of the reader 31 is arranged in the same position as it is in the printer 1C.

A case will be assumed in which the user places the covers 24A and 24B in the open position, and positions the reader 31 below the second path W2, for example. In this case, the reader 31 is mounted to the carriage 35 from above. The user then places the covers 24A and 24B in the closed position. The user sets the mode to the take-up mode, and causes the printer 1D to perform printing onto the medium M. In this case, the reader 31 can read the medium M being conveyed along the second path W2 in the take-up path Q3.

Meanwhile, a case will be assumed in which the user places the covers 24A and 24B in the open position, and positions the reader 31 in front of the first path W1, for example. In this case, the reader 31 is mounted to the mounting portion 351 from above. Then, the user places the covers 24A and 24B in the closed position. The user then sets the mode to the take-up mode, and causes the printer 1D to perform printing onto the medium M. In this case, the reader 31 can read the medium M being conveyed along the first path W1 in the take-up path Q3.

In the printer 1D, the reader 31 is arranged on the first path W1 or the second path W2 while the covers 24A and 24B are open. In the printer 1D, the user can select the position of the reader 31. Note that with the printer 1D, the reader 31 may be mounted while the right panel 25 is open.

Also, in the printer 1D, the covers 24A and 24B are arranged in positions opposite to the medium supply spindle 86 with respect to the head 84 in the front-rear direction. Therefore, the user can easily access the reader 31, and easily attach/detach the reader 31 to/from the printer 1D. Therefore, the printer 1D is very user-friendly.

Figure 7:
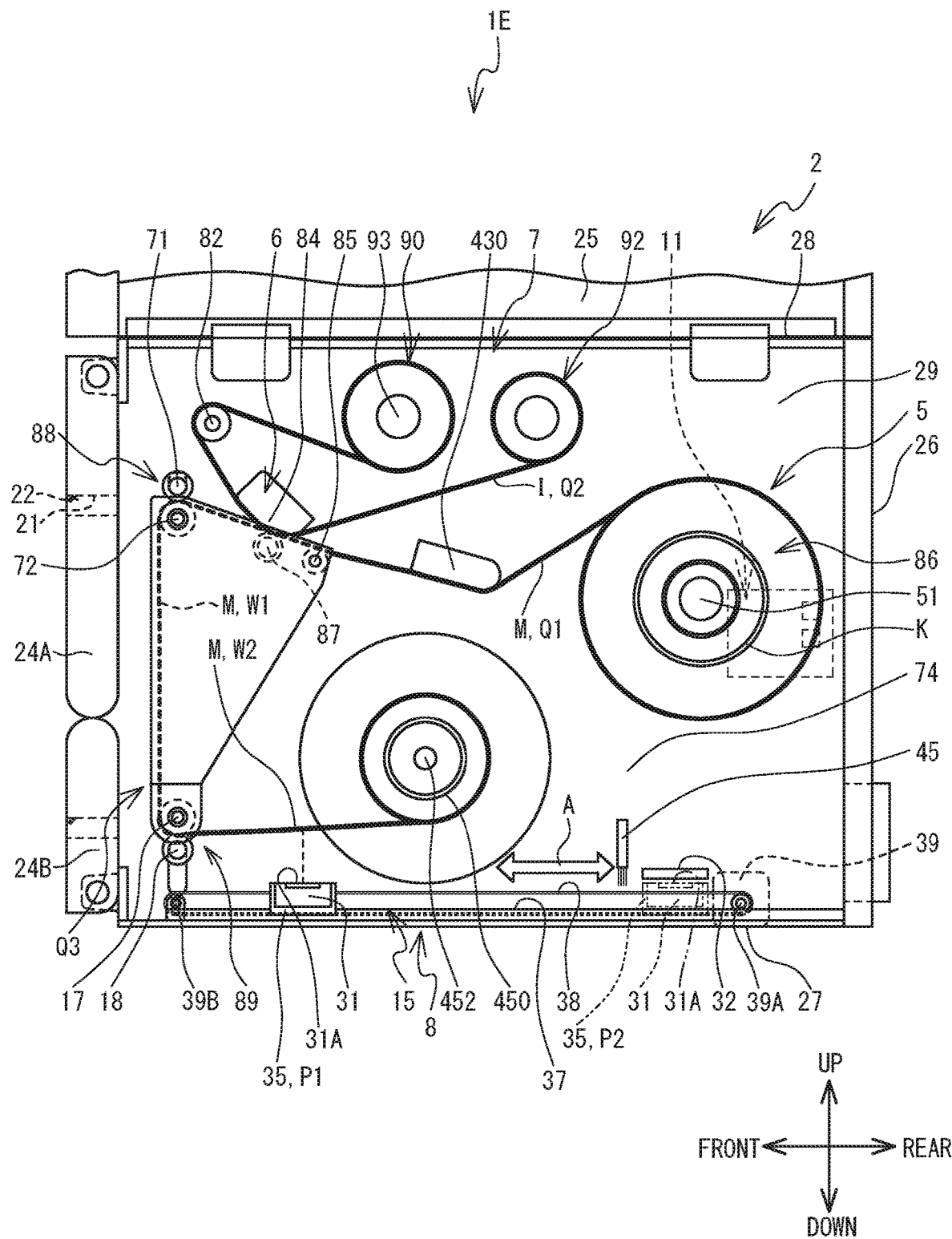
FIG. 7 is a right-side view of the inside of a printer.

A printer 1E will now be described with reference to FIG. 7. In the description below, like reference characters will be used for structures having similar functions as the structures of the printers 1A to 1D, and descriptions of those structures will be omitted or simplified. The printer 1E differs from the printers 1A to 1D in that a brush 45 is provided instead of the maintenance unit 9.

The brush 45 is arranged between the reading position P1 and the retracted position P2. The brush 45 extends in the left-right direction. Here, when the carriage 35 moves between the retracted position P2 and the reading position P1, the reading surface 31A of the reader 31 abuts against the brush 45. When printing starts, the carriage 35 moves from the retracted position P2 to the reading position P1, so paper dust and the like on the reading surface 31A can be removed by the brush 45. Also, when printing is complete, the carriage 35 moves from the reading position P1 to the retracted position P2, so paper dust and the like on the reading surface 31A can be removed by the brush 45.

In the printer 1E, when the carriage 35 moves between the retracted position P2 and the reading position P1, the reader 31 abuts against the brush 45. As a result, the effect from paper dust on the reader 31 can be reduced. Note that the brush 45 may extend in the front-rear direction instead of the left-right direction. In this case, the brush 45 may remove paper dust and the like while moving in the left-right direction on the reading surface 31A.

Figure 8:
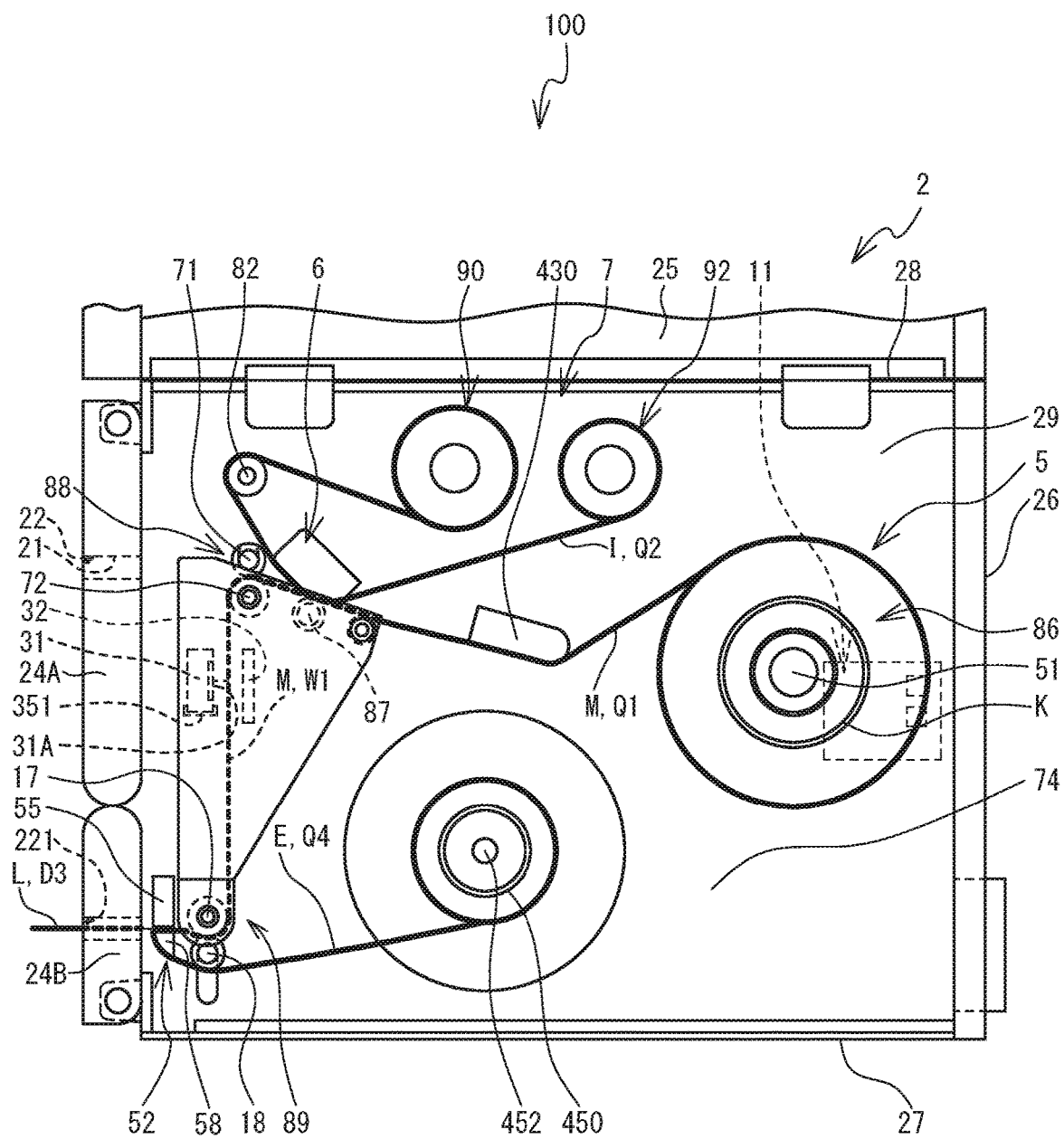
FIG. 8 is a right-side view of the inside of a printer.
Figure 8:
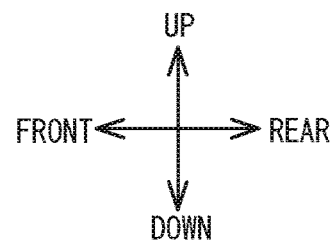

A printer 100 will now be described with reference to FIG. 8. In the description below, like reference characters will be used for structures having similar functions as the structures of the printers 1A to 1E, and descriptions of those structures will be omitted or simplified. The printer 100 differs from the printers 1A to 1E in that the positions of the conveyer 88, the reader 31, and the illumination correction plate 32 are different, and a peeling unit 52 is provided. In order to convey the medium M downward, the conveyer 88 is arranged below and to the rear compared to its position in the printer 1A. The reader 31 and the illumination correction plate 32 are arranged to the rear compared to their positions in the printer 1B.

The peeling unit 52 is arranged in front of the conveyer 89 and to the rear of the second discharge outlet 221. The peeling unit 52 peels a label L from packing paper E of the medium M. The peeling unit 52 uses peelers 55 and 58 to peel the label L from the backing paper E of the medium M conveyed along a third discharge path D3. The third discharge path D3 is a path from the roller 87 to the second discharge outlet 221. The peeled label L is conveyed along the third discharge path D3 and is discharged from the second discharge outlet 221. Meanwhile, the backing paper E, of the medium M from which the label L was peeled, is conveyed along a take-up path Q4 and is taken up by the take-up unit 450. The take-up path Q4 is a path from the peeling unit 52 to the take-up unit 450. Note that in this case as well, the printer 100 can read the medium M with the reader 31.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The present disclosure is not limited to the foregoing embodiments, and may be modified in various ways without departing from the scope and spirit thereof. Note that the features disclosed in the foregoing embodiments and modified examples below may be combined as long as they do not contradict one another.

In the embodiment described above, the printer 1A is controlled by the controller 11, but the printer 1A is not limited to this. For example, the printer 1A may alternatively be controlled by an external device such as a PC or a tablet, for example.

In the embodiment described above, a thermal head-type printer is described, but the printer is not limited to this kind of printer. For example, the printer 1A may be a printer that can perform printing by an inkjet head.

In the embodiment described above, the medium M is a roll-type medium, but the medium M is not limited to this. For example, the medium M may be a fanfold-type medium. In this case, the printer 1A may be configured to supply the medium M from outside the printer 1A.

The medium supply spindle 86, the conveyers 88 and 89, and the take-up unit 450 of the embodiment described above are arranged in the positions shown in FIG. 1 to FIG. 3, but the positions in which they are arranged may be changed as appropriate. In accordance with this, the directions of the paths Q1 to Q3, D1, and D2 may also be changed as appropriate.

The ribbon supply unit 7 of the embodiment described above is configured to supply the ink ribbon I with the ink ribbon I contacted to the head 84, but the way in which the ink ribbon I is conveyed is not limited to this. For example, one or a plurality of rollers may be arranged separately, and the ink ribbon I may be conveyed via these rollers.

In the unchecked paper discharge mode of the embodiment described above, the medium supply spindle 86 and the conveyer 88 are driven to convey the medium M, but the way in which the medium M is conveyed is not limited to this. For example, the medium M may alternatively be conveyed by driving only the conveyer 88, without driving the medium supply spindle 86. The medium supply unit 5 may drive the drive unit and the conveyer 88 as appropriate.

In the take-up mode of the embodiment described above, the medium M is conveyed by driving the medium supply spindle 86, the conveyers 88 and 89, and the take-up unit 450, but the way in which the medium M is conveyed is not limited to this. For example, the medium M may alternatively be conveyed by driving only the take-up unit 450, without driving the medium supply spindle 86 and the conveyers 88 and 89. The medium supply unit 5 may drive the drive unit and the conveyers 88 and 89 as appropriate.

In the embodiment described above, the reader 31 is a CIS, but it is not limited to this. For example, the reader 31 may alternatively be a CCD. In this case, the illumination correction plate 32 may be a simple plate instead of a white plate. Also, the illumination correction plate 32 or the plate need not be provided. The mode of conveyance of the reader 31 may be changed as appropriate.

In the embodiment described above, the carriage 35 is able to move between the reading position P1 and the retracted position P2 shown in FIG. 1 to FIG. 3, but it is not limited to this. For example, the positions of the reading position P1 and the retracted position P2 may be changed as appropriate.

In the embodiment described above, the fan 41 blows or draws in air while moving in the left-right direction, but it is not limited to this. For example, the fan 41 may be able to swing and change the direction in which it blows air or change the direction in which it is able to draw in air.

At least one specification heading is required. Please delete this heading section if it is not applicable to your application. For more information regarding the headings of the specification, please see MPEP 608.01(a).

What is claimed is:

1. A printer configured to perform printing onto a medium including a label and backing paper, the printer comprising:
a medium supply unit configured to supply the medium;
a head configured to perform printing onto the medium supplied from the medium supply unit;
a discharge outlet configured to discharge the medium onto which printing has been performed by the head and conveyed along a discharge path connecting the head and the discharge outlet;
a take-up unit arranged below the head and configured to take up the medium onto which printing has been performed by the head or the backing paper with the label peeled off from the medium; and
a reader arranged on a take-up path connecting the head to the take-up unit and configured to read the medium onto which printing has been performed by the head and conveyed along the take-up path.

2. The printer according to claim 1, wherein
the take-up path includes a first path extending downward, below the head, and
a reading surface of the reader faces the first path.

3. The printer according to claim 1, wherein
the take-up unit is arranged in a position below the head and opposite to the discharge outlet with respect to the head in a conveyance direction of the medium in the discharge path;
the take-up path includes
a first path extending downward, below the head, and
a second path extending from a lower end portion of the first path toward the take-up unit in the conveyance direction, and
a reading surface of the reader faces the second path.

4. The printer according to claim 3, further comprising:
a carriage configured to support the reader and configured to move between a reading position and a retracted position, the reading position being a position below the second path and where the medium conveyed along the second path is read, the retracted position being a position retracted from the second path; and
a motor configured to cause the carriage to move.

5. The printer according to claim 4, further comprising:
a plate arranged opposite to the first path with respect to the take-up unit in the conveyance direction,
wherein the retracted position of the carriage is below the plate.

6. The printer according to claim 5, wherein
the plate is an illumination correction plate, and
the reader reads the plate when the carriage is in the retracted position.

7. The printer according to claim 4, further comprising:
a brush arranged between the reading position and the retracted position,
wherein the reading surface of the reader abuts against the brush when the carriage moves between the reading position and the retracted position.

8. The printer according to claim 4, further comprising:
a fan configured to blow air toward the reading surface of the reader or draw in air from above the reading surface of the reader, when the carriage is in the retracted position.

9. The printer according to claim 1, further comprising:
a main body; and
a cover configured to open and close with respect to the main body,
wherein
the take-up unit is arranged in a position below the head and opposite to the discharge outlet with respect to the head in a conveyance direction of the medium in the discharge path,
the take-up path includes
a first path extending downward, below the head, and
a second path extending from a lower end portion of the first path toward the take-up unit in the conveyance direction, and
the reader is arranged in the first path or the second path while the cover is open.

10. The printer according to claim 9, wherein
in the main body, the cover is arranged in a position opposite to the medium supply unit with respect to the head in the conveyance direction.

11. The printer according to claim 1, wherein
the head is a thermal head provided with a plurality of heating elements.

12. A printer comprising:
a medium supply unit configured to supply a medium;
a head configured to perform printing onto the medium supplied from the medium supply unit;
a first discharge outlet configured to discharge the medium onto which printing has been performed by the head and conveyed along a first discharge path connecting the head and the first discharge outlet;
a second discharge outlet arranged below the first discharge outlet and configured to discharge the medium onto which printing has been performed by the head and conveyed along a second discharge path connecting the head and the second discharge outlet, the second discharge outlet being different from the first discharge outlet; and
a reader arranged on the second discharge path and configured to read the medium onto which printing has been performed by the head,
wherein
the second discharge path includes a first path extending downward, below the head, and a reading surface of the reader faces the first path.

13. The printer according to claim 12, wherein the head is a thermal head provided with a plurality of heating elements.

\* \* \* \* \*